United States Patent [19]

Gerlinger

[11] 4,194,348

[45] Mar. 25, 1980

[54] HAYMAKING MACHINE WITH ROTARY RAKE HEADS

[75] Inventor: Fréderic Gerlinger, Ottersthal, France

[73] Assignee: Kuhn, S.A., Saverne, France

[21] Appl. No.: 882,215

[22] Filed: Feb. 28, 1978

[30] Foreign Application Priority Data

Mar. 4, 1977 [FR] France .............................. 77 06885

[51] Int. Cl.² ............................................ A01D 79/00
[52] U.S. Cl. ..................................................... 56/377
[58] Field of Search .................. 56/370, 377, 365, 366

[56] References Cited

U.S. PATENT DOCUMENTS 3,475,890  11/1969  Purrer et al. ............................ 56/370
3,832,838   9/1974  Hale ....................................... 56/370

*Primary Examiner*—Russell R. Kinsey
*Attorney, Agent, or Firm*—Young & Thompson

[57] ABSTRACT

The disclosure is of a haymaking machine with rotary rake heads and a chassis connected by a beam to a hitch device for coupling to a tractor three-point power lift, characterized in that the said connection beam is on the one hand pivoted at its forward end to the hitch device about a substantially vertical pivot spindle and on the other hand is fixed rigidly at its rear end to the support chassis of the rotary rake heads in such manner as to retain the said support chassis during operation in a position in which it constantly forms an obtuse angle with the direction of travel of the machine.

7 Claims, 4 Drawing Figures

Fig:1
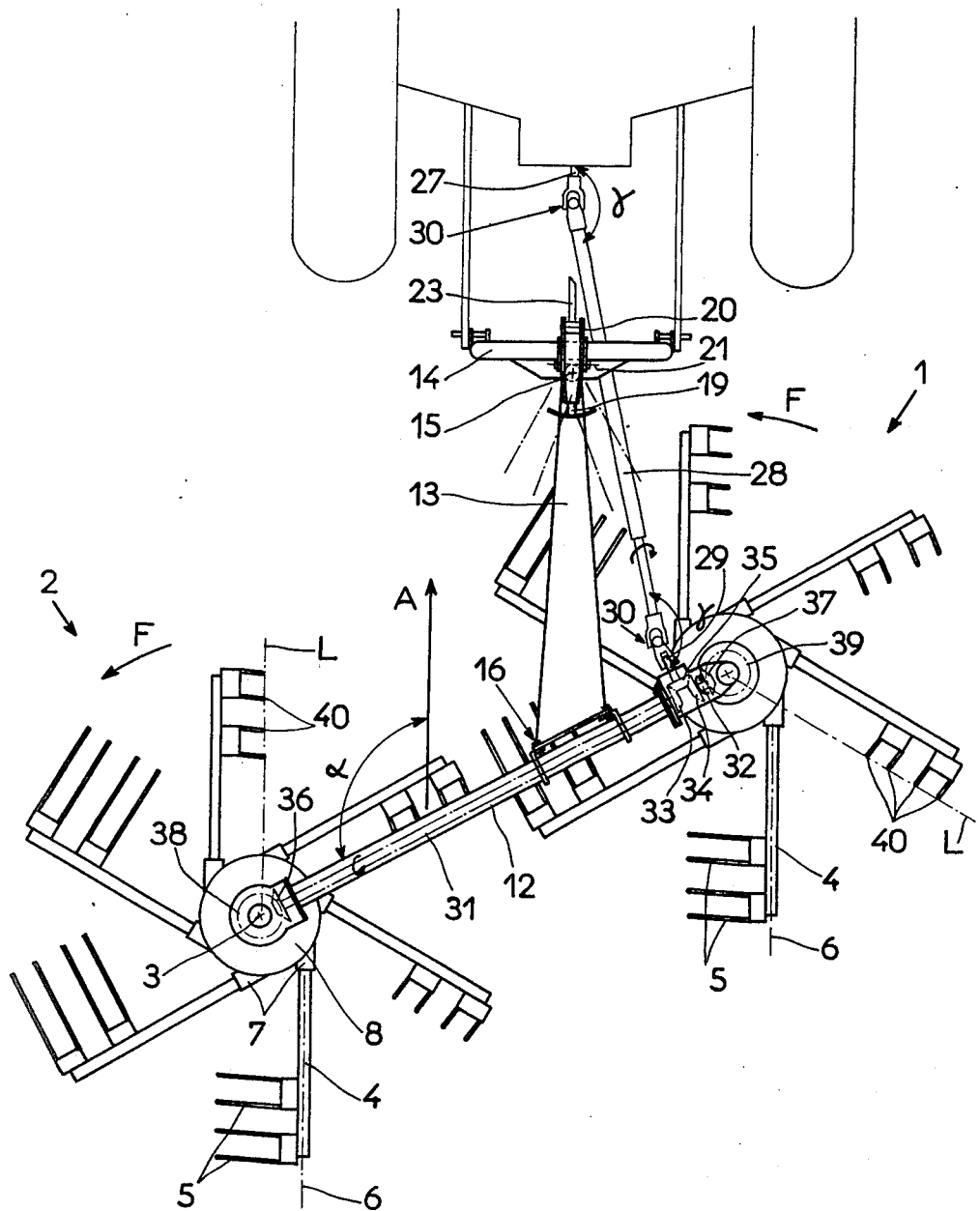

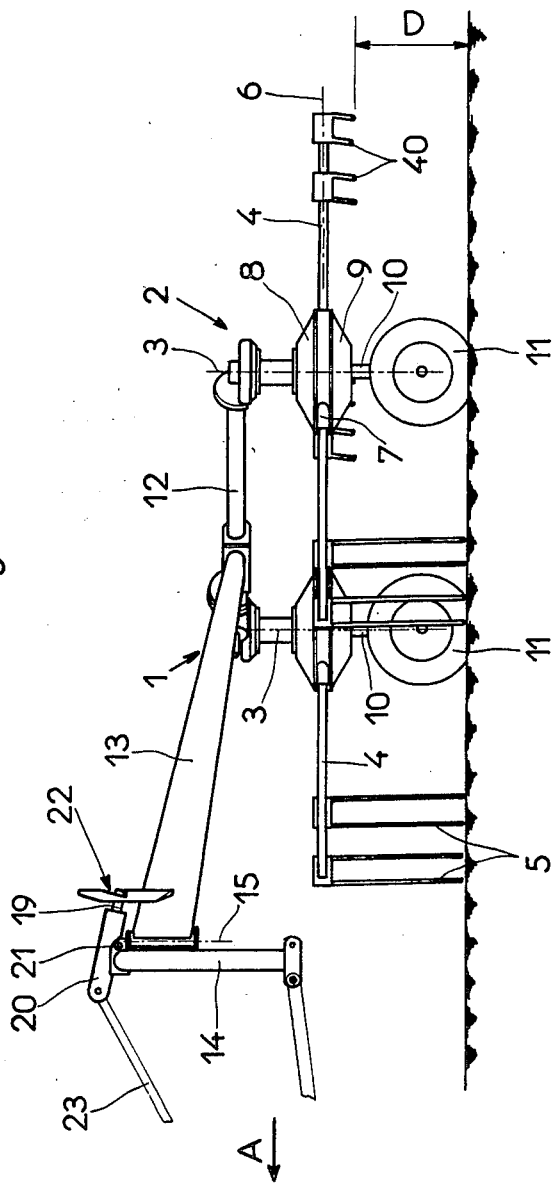
Fig: 2

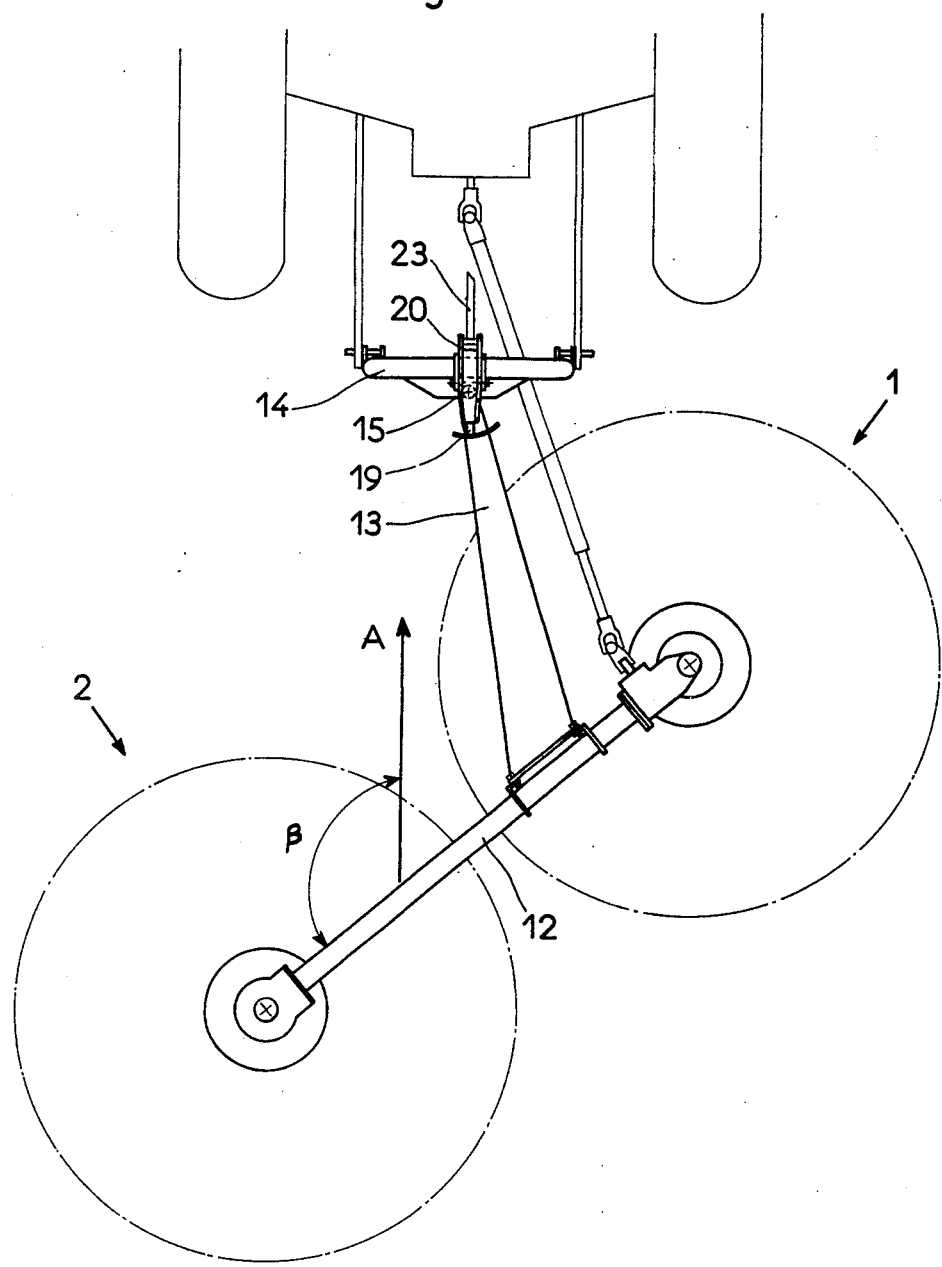
Fig:3

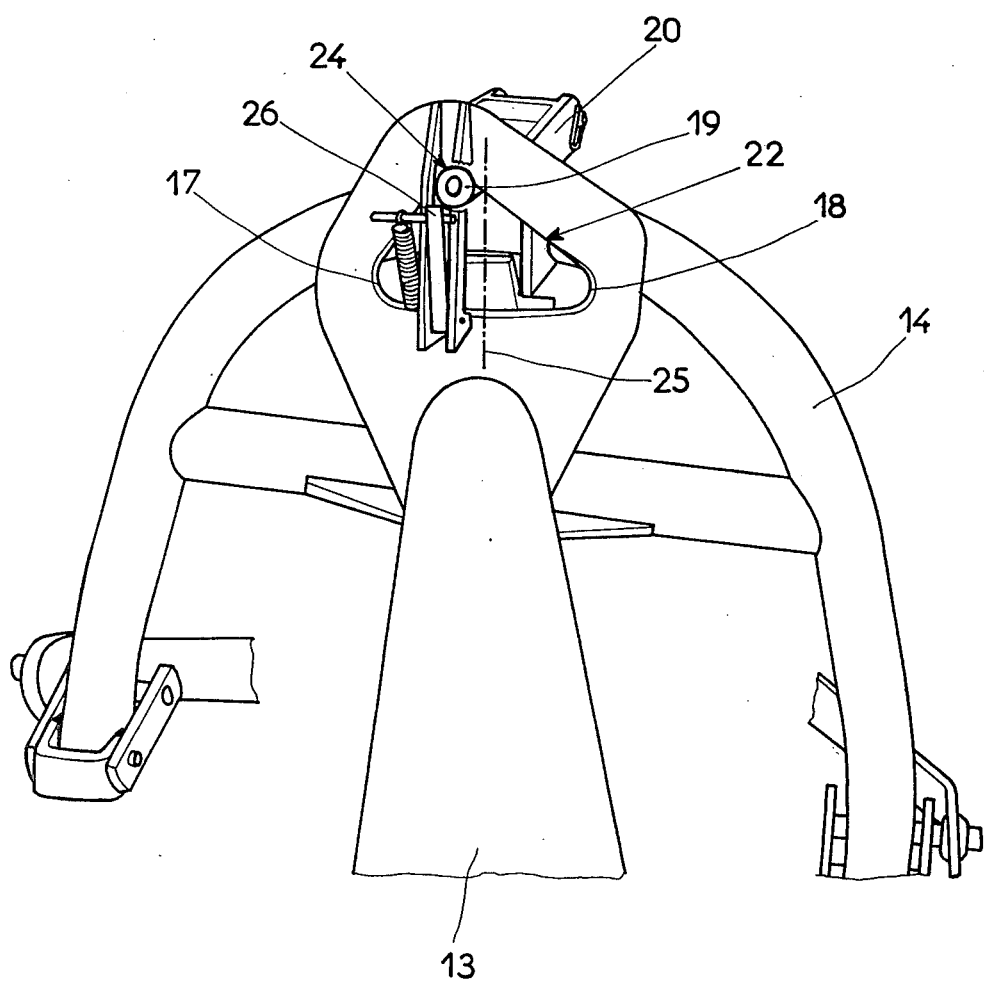
Fig: 4

HAYMAKING MACHINE WITH ROTARY RAKE HEADS

INTRODUCTION AND BACKGROUND OF THE INVENTION

The present invention relates to haymaking machines for the lateral windrowing of fodder, comprising at least two rotary rake heads which are driven in rotation in such manner as to turn in the same direction about substantially vertical axes, and each of which is provided with several tool-carrier arms which extend outwards and can oscillate about their longitudinal axes under the action of a control mechanism in such manner as to cause the working tools, over a partial zone of their trajectory, to pivot upwards and in the direction opposite to the direction of rotation of the rotary rake heads. The said rotary rake heads are interconnected by means of a support chassis disposed obliquely in relation to the direction of travel of the machine in such manner that the said rotary rake heads are staggered in relation to one another towards the rear. This chassis is itself connected by means of a connection beam to a hitch device permitting coupling of the machine to the three-point hoist device of a propelling tractor.

These machines comprising rotary rake heads equipped with controlled working tools permit carrying out windrowing work of better quality than the machines where the working tools are immobile over their whole trajectory. In fact on machines equipped with immobile working tools the fodder is projected laterally at high speed so that it may clear itself from the said working tools. When the fodder is dry this projection causes significant stripping of leaves, involving a loss of nutrient elements. On the other hand on machines with controlled tools the fodder is deposited gently by the working tools which advantageously disengage themselves from the said fodder by virtue of their pivoting.

On known machines of the kind to which the present invention relates, the connection between the support chassis of the rotary rake heads and the hitch device is rigid during operation. These machines possess especially the drawback that when one turns towards the right or the left, for example at the end of a field or in a curve, the support chassis places itself in a position in which it is substantially perpendicular to the direction of travel of the machine. In this case the rotary rake heads are no longer staggered in relation to one another and each forms its own windrow, which is not desirable since this renders collection of the windrows more difficult.

One of the purposes of the present invention is to produce a haymaking machine as described in the introduction which is not very burdensome and does not possess the above-mentioned drawbacks of the known machines.

BRIEF SUMMARY OF THE INVENTION

To this end one of the characteristics of the invention consists in that the connection beam is on the one hand pivoted at its forward end to the hitch device by means of a substantially vertical pivot spindle and on the other hand rigidly fixed at its rear end to the support chassis of the rotary rake heads.

FURTHER DESCRIPTION AND ADVANTAGES OF THE INVENTION

Thus during operation the said connection beam and the said support chassis of the rotary rake heads can pivot about this substantially vertical spindle so that the said support chassis constantly forms an obtuse angle with the direction of travel of the machine. The rotary rake heads are therefore always staggered in relation to one another towards the rear and the trajectory of the working tools of the rotary rake head situated farther to the rear partially overlaps the trajectory described by the working tools of the other rotary rake head. Thus the folder is constantly transmitted from one rotary rake head to the other for the formation of a lateral windrow, even when the tractor is turning towards the right or towards the left.

The pivoting of the connection beam and the support chassis is advantageously limited in order to avoid excessive movements. For this purpose the connection beam comprises two abutments which co-operate with a stop fixed to the hitch device of the machine.

During transport the connection beam and the support chassis are automatically brought and locked into a position in which the said support chassis forms with the direction of travel of the machine an angle greater than that which it forms with the said direction of travel during operation in a straight line. For this purpose the abutments of the connection beam form a guide ramp substantially of inverted V-form the apex of which is offset in relation to the central axis passing between the said abutments, in which apex the stop of the hitch device lodges thus immobilising the connection beam in an oblique position in relation to the direction of travel. By reason of the arrangement of the support chassis during transport the rotary rake heads are situated substantially in alignment with the tractor and the bulk of the machine is substantially reduced.

A further characteristic of the invention consists in that the intermediate sleeve for the rotating drive of the rotary rake heads, which is intended to be connected to the power take-off shaft of the propelling tractor by means of a Cardan shaft, is disposed on the oblique support chassis forming a right angle therewith, and is situated closer to the rotary rake head which is forward in relation to the direction of travel of the machine, so that the angles which the said intermediate sleeve and the said power take-off shaft from with the Cardan shaft are substantially identical. This characteristic permits of having extremely simple and thus cheap transmission elements, despite the fact that the support chassis is disposed obliquely in relation to the direction of travel of the machine. In fact the bevel pinions of the two shafts which drive the rotary rake heads in rotation can be in direct engagement with the bevel pinion fixed to the intermediate sleeve. Moreover the Cardan shaft connecting the said intermediate sleeve to the power take-off shaft of the tractor does not necessitate double constant-speed joints to ensure transmission of the movement under good conditions.

A further characteristic of the invention consists in that the lower extremities of the working tools of the rotary rake heads are situated on a line passing through the axis of rotation of the corresponding rotary rake head, when they are close to the ground, and in that their carrier arms are substantially parallel with the said line and are situated in front of it—seen in the direction of rotation of the rotary rake heads. By virtue of this characteristic the lower extremities of the working tools remain substantially within the trajectory described by the working tool most remote from the rotation axis of the corresponding rotary rake head, at the time of their pivoting upwards and in the direction opposite to the direction of rotation for disengagement from the raked fodder. These extremities therefore are not in danger of hooking up windrowed fodder when they move towards the rear side of the rotary rake heads—seen in the direction of travel of the machine. Moreover by virtue of this position of the working tools and of their tool-carrier arms, the centrifugal force exerted radially during rotation of the rotary rake heads favours the clearing of the fodder from the said working tools.

The invention will be explained in greater detail hereinafter, with further characteristics and advantages, in the description of a form of embodiment of the invention given by way of non-limitative example below with reference to the accompanying drawings.

BRIEF DESCRIPTION OF THE VIEWS IN THE DRAWINGS

In the said drawings:

FIG. 1 represents a plan view of a machine according to the invention in the operating position, FIG. 2 represents a side view of the machine as represented in FIG. 1, FIG. 3 represents a plan view of a machine according to the invention in the transport position, FIG. 4 represents a detail of the guide ramp of the connection beam.

DETAILED DESCRIPTION OF THE PREFERRED EMBODIMENT

In the drawings, the haymaking machine for the lateral windrowing of fodder as represented in FIGS. 1 and 2 comprises two substantially identical rotary rake heads 1 and 2 driven in rotation so as to turn in the same direction (arrows F) about substantially vertical rotation axes 3. Each of these rotary rake heads 1 and 2 is provided with several arms 4 carrying working tools 5 such as tines, forks or the like elements. The said arms 4 extend outwards and can oscillate about their respective longitudinal axes 6 under the action of a control mechanism in such manner as to cause the working tools 5, over a partial zone of their trajectory, to pivot upwards and in the direction opposite to the direction F of rotation of the rotary rake heads 1 and 2, in order to disengage the said working tools 5 from the raked fodder to favour the formation of a windrow. For this purpose the tool-carrier arms 4 are mounted for pivoting in support bearings 7 fixed with the rotary rake heads 1 or 2 by means of supports 8 and 9. The said control mechanism is advantageously disposed in the space between the supports 8 and 9 and is composed in a known manner of a guide cam which is mounted on the support shaft 10 of each of the rotary rake heads 1 and 2, and in which during operation there move rollers fast with control cranks which are fixed to the internal extremities of the tool-carrier arms 4.

During normal operation the machine according to the invention can rest on the ground by means of small wheels 11 disposed beneath the rotary rake heads 1 and 2.

The two rotary rake heads 1 and 2 are interconnected by means of a support chassis 12 disposed obliquely in relation to the direction A of travel of the machine. This support chassis 12 is itself connected, by means of a connection beam 13, to a hitch device 14 permitting coupling of the machine to the three-point hoist device of a propelling tractor.

According to the invention the said connection beam 13 is on the one hand with its forwardly directed extremity connected to the hitch device 14 by means of a substantially vertical pivot shaft 15 and on the other hand is fixed rigidly at its rear end to the support chassis 12 of the rotary rake heads 1 and 2. This rigid connection is advantageously realised by means of dismantleable connection elements 16 such as bolts.

This arrangement permits the connection beam 13 and the support chassis 12 to pivot freely in relation to the hitch device 14 and to the pulling tractor during normal operation as represented diagrammatically in FIG. 1. Thus the said support chassis 12 can remain in a position in which it constantly forms an obtuse angle $\alpha$ with the direction A of travel of the machine, so that the rotary rake heads 1 and 2 are always staggered towards the rear in relation to one another and so that the trajectory of the working tools 5 of the rotary rake head 2 situated further to the rear at least partially overlaps the trajectory described by the working tools of the forwardly disposed rotary rake head 1. Therefore all of the fodder raked by the said forwardly placed rotary rake head 1 is continuously moved to and taken up by the rotary rake head 2 placed to the rear, completing the formation of a laterally disposed windrow. During operation the value of the angle $\alpha$ mentioned above can preferably vary between 93° and 143°. In the straight-ahead working position as represented in FIG. 1 the value of the said angle $\alpha$ is preferably greater than 115°.

The above-mentioned pivoting about the substantially vertical pivot shaft 15 during work is limited by means of abutments 17 and 18 fixed on the connection beam 13 and a stop 19 secured to the hitch device 14. This stop 19 is advantageously disposed on a lever 20 constituting the upper hook attachment point of the hitch device 14. The said lever 20 is articulated to the said hitch device 14 about a substantially horizontal shaft 21 permitting it to pivot in a substantially vertical plane. Structure which defines abutments 17 and 18 extends upwardly to form a guide ramp 22 of substantially inverted V-form intended to co-operate with the stop 19 to bring the machine into the transport position (FIG. 4). Thus when the machine is subjected to at least partial elevation by means of the three-point hoist device of the tractor, to bring it into the said transport position, the lever 20 constituting the upper hitch point of the hitch device 14 and the stop 19 disposed on the said lever pivot about the substantially horizontal articulation shaft 21 under the action of the reaction of the top link 23. Whatever the position of the machine at that moment, the stop 19 displaces the guide ramp 22 and consequently the connection beam 13 to which it is secured, so that it can lodge in the apex 24 of the said guide ramp 22. The said stop 19 thus brings and locks the connection beam 13 and the support chassis 12 of the rotary rake heads 1 and 2 into a position appropriate for transport as represented in FIG. 3, in which the said support chassis automatically forms with the direction A of travel of the machine an angle $\beta$ which is always greater than the angle $\alpha$ which it forms with the said direction A of travel of the machine during straight-ahead operation. To this end according to the invention the apex 24 of the guide ramp 22 of the connection beam 13 is offset in relation to the central axis 25 passing between the two abutments 17 and 18 defining the extreme positions of the said connection beam 13 (FIG. 4).

By virtue of this characteristic the rotary rake heads 1 and 2 are substantially brought into alignment with the tractor without the overhang of the machine being too great. Thus the machine according to the invention possesses a great working width when it is in the working position and a reduced transport width to facilitate movement over roads.

The connection beam 13 can be locked in the transport position by means of a spring catch 26 which holds the stop 19 in the apex 24 of the guide ramp 22. To return the machine from the transport position into the working position, it is sufficient to release the stop 19 by disengaging the catch 26 and to rest the machine on the ground so that the said stop 19 disengages itself from the apex 24 of the guide ramp 22.

When the machine is situated in the working position the rotary rake heads 1 and 2 are driven in rotation from the power take-off shaft 27 of the propelling tractor. The transmission of the drive movement is effected by means of a Cardan shaft 28 connecting the said power take-off shaft 27 to an intermediate sleeve 29 one of the extremities of which extends to the interior of the oblique support chassis 12. According to the invention this intermediate sleeve 29 forms a right angle with the said support chassis 12 and is situated closer to the rotary rake head 1 which is forward in relation to the direction A of travel of the machine, so that the angles $\gamma$ which the said intermediate sleeve 29 and the said power take-off shaft 27 form with the Cardan shaft 28 are substantially identical. The Cardan shaft 28 can therefore comprise simple joints 30 which are relatively inexpensive.

From the intermediate sleeve 29 the drive movement is transmitted to the rotary rake heads 1 and 2 by means of two shafts 31 and 32 represented in dot-and-dash lines in FIG. 1, which are lodged in the oblique support chassis 12 and each of which is directed towards one of the said rotary rake heads 1 and 2. Each of these shafts 31 and 32 comprises at its extremity adjacent the intermediate sleeve 29 a bevel pinion 33 and 34 in direct mesh with another bevel pinion 35 fixed to the said intermediate sleeve 29, which pinion 35 thus drives the said shafts 31 and 32 in rotation so that they rotate in opposite directions to one another. Each of these half shafts 31 and 32 further comprises, at its extremity adjacent the rotary rake heads 1 and 2, a second bevel pinion 36 and 37 which is in engagement with a toothed ring 38 and 39 fixed to the said rotary rake heads 1 and 2. By virtue of their arrangement and their opposite directions of rotation the two bevel pinions 36 and 37 drive the rotary rake heads 1 and 2 so that they turn in the same direction F of rotation.

According to a characteristic of the invention the lower extremities 40 of the working tools 5 which rake the fodder when the rotary rake heads 1 and 2 are driven in rotation are situated on a line L passing through the rotation axis 3 of the corresponding rotary rake head 1 or 2, when the said lower extremities are close to the ground (FIG. 1). By virtue of this characteristic these lower extremities 40 remain substantially within the trajectory described by the working tool 5 more remote from the rotation axis 3 of the corresponding rotary rake head 1 or 2, during their pivoting for disengagement from the raked fodder. Thus they do not come into contact with the windrowed fodder when they move towards the rear of the rotary rake heads 1 and 2, and thus are in no danger of extraining fodder towards the said rear. Moreover by virtue of this arrangement the centrifugal force exerted radially during the rotation of the rotary rake heads 1 and 2 favours the clearing of the fodder from the working tools 5.

In order that the lower extremities 40 of all the working tools 5 of one and the same tool-carrier arm 4 may be situated on the same line L, these arms are disposed parallel with this line L. Moreover these tool-carrier arms 4 are situated before the line L of their respective working tools 5—seen in the direction F of rotation of the rotary rake heads 1 and 2—when the lower extremities 40 of these tools are close to the ground.

Thus for a certain angle of pivoting of the tool-carrier arms 4 about their respective longitudinal axes 6, the distance D between the ground and the lower extremities 40 of the working tools 5 is greater than if the said tool-carrier arms 4 and the line L on which the said lower extremities 40 of their respective working tools 5 are situated were in coincidence—seen from above. Thus this arrangement permits the production of windrows of large volume.

It is quite apparent that the present invention is not limited to the form of embodiment as described above. In fact various improvements, modifications or additions may be made therein or certain elements may be replaced by equivalent elements, without thereby departing from the scope of the present invention.

What is claimed is:

1. A haymaking machine for the lateral windrowing of fodder, comprising at least two rotary rake heads which are driven in rotation so as to turn in the same direction about substantially vertical axes, several tool-carrier arms mounted on each said rake head for oscillation about their longitudinal axes, said arms extending outwardly from adjacent the vertical axis of their associated rake heads, control mechanism disposed about said vertical axes for oscillating said arms so as to cause the working tools, over a partial zone of their trajectory, to pivot upward and in the direction opposite to the direction of rotation of the rotary rake heads, a support chassis that interconnects said rake heads and which is disposed obliquely in relation to the direction of travel of the machine, a hitch device permitting coupling of the machine to the three-point hoist device of a propelling tractor, and a connection beam which connects the chassis to the hitch device, and a substantially vertical pivot spindle which connects the front end of said beam to the hitch device, the rear end of said beam being rigidly connected to said chassis in such manner as to retain said chassis during normal operation in a position in which it constantly forms an obtuse angle with the direction of travel of the machine.

2. A machine according to claim 1, and abutment means fixed on said beam which define two extreme positions between which said beam and chassis can pivot freely relative to each other about said spindle during normal operation, and means whereby said beam and chassis are brought and locked into a transport position in which said chassis automatically forms with the direction of travel of the machine an angle which is always greater than the angle which it forms with said direction of travel during straight-ahead operation.

3. A machine according to claim 2, in which the structure which defines said abutments extends upwardly to form a guide ramp the apex of which is offset in relation to a central axis passing between the two abutments.

4. A machine according to claim 1, and means to drive said rotary rake heads in rotation about said vertical axes, an intermediate sleeve for said drive, a Cardan shaft for connecting said sleeve to a power take-off shaft of a propelling tractor, said sleeve being disposed on said chassis and forming a right angle therewith and being situated closer to said rake head which is situated most forward relative to the direction of travel of the machine, whereby the angles which said sleeve and power take-off shaft form with said Cardan shaft are substantially identical.

5. A machine according to claim 4, said means for driving said rotary rake heads in rotation comprising two shafts which are lodged in said chassis, and three bevel pinions, two of which drive said two shafts in rotation in opposite directions and which are in direct mesh with the third said pinion, said third pinion being fixed to said sleeve.

6. A machine according to claim 1, the lower ends of said working tools of said rake heads being located on a line passing substantially through said vertical axis of the associated said rake head, when said working tools are close to the ground.

7. A machine according to claim 6, in which said tool-carrier arms are substantially parallel to said line and are located in front of said line in the direction of rotation of the associated said rake head when said lower ends of the working tools are close to the ground.

* * * * *